United States Patent [19]

Pugh et al.

[11] Patent Number: 5,583,508

[45] Date of Patent: Dec. 10, 1996

[54] METHODS AND SYSTEMS OF ATTITUDE DETERMINATION

[75] Inventors: Bryan Pugh; Timothy J. Murphy, both of Bristol, England

[73] Assignee: British Aerospace Public Limited Company, London, England

[21] Appl. No.: 559,952

[22] Filed: Jul. 31, 1990

[30] Foreign Application Priority Data

Aug. 2, 1989 [GB] United Kingdom .................. 8917643

[51] Int. Cl.$^6$ .............................. G01S 13/06; G01S 13/48
[52] U.S. Cl. .............................. 342/62; 342/146; 342/147; 342/148
[58] Field of Search .............................. 342/62, 146, 147, 342/148

[56] References Cited

U.S. PATENT DOCUMENTS

| | | | |
|---|---|---|---|
| H247 | 4/1987 | Clark et al. | 364/434 |
| H955 | 8/1991 | Waters | 342/108 |
| 3,534,364 | 10/1970 | Burford | 342/353 |
| 3,725,930 | 4/1973 | Caruso, Jr. | 342/351 |
| 3,856,237 | 12/1974 | Torian et al. | 342/62 X |
| 3,992,106 | 11/1976 | Auerbach | 356/141 |
| 4,072,281 | 2/1978 | Miller, Jr. et al. | 244/3.16 |
| 4,110,752 | 8/1978 | Neri | 342/77 |
| 4,148,029 | 4/1979 | Quesinberry | 342/106 |
| 4,194,204 | 3/1980 | Alpers | 342/80 |
| 4,204,210 | 5/1980 | Hose | 342/25 |
| 4,216,472 | 8/1980 | Albanese | 342/95 |
| 4,256,275 | 3/1981 | Flick et al. | 342/62 X |
| 4,370,656 | 1/1983 | Frazier et al. | 342/458 |
| 4,373,808 | 2/1983 | Pell et al. | 356/152 |
| 4,595,925 | 6/1986 | Hansen | 342/123 |
| 4,626,861 | 12/1986 | Wiley | 342/458 |
| 4,649,390 | 3/1987 | Andrews et al. | 342/140 |
| 4,724,437 | 2/1988 | Jones et al. | 342/101 |
| 4,734,702 | 3/1988 | Kaplan | 342/424 |
| 4,752,779 | 6/1988 | Jones et al. | 342/80 |
| 4,828,382 | 5/1989 | Vermilion | 342/13 X |
| 4,837,574 | 6/1989 | Hill | 342/27 |

FOREIGN PATENT DOCUMENTS

| | | |
|---|---|---|
| 0038151 | 10/1981 | European Pat. Off. . |
| 0343131 | 11/1989 | European Pat. Off. . |
| 2094089 | 9/1982 | United Kingdom . |
| WO87/03359 | 6/1987 | WIPO . |

OTHER PUBLICATIONS

Applied Optics, vol. 21, Jun. 1982, New York US Aruga et al "Determination of a Spacecraft Attitude Using a Ground–Based (cont't) Laser", pp. 2291–2295.
European Search Report.
IEEE Standard Dictionary of Electrical and Electronics Term, ANSI/IEEE, Std. 100–1984, Third Edition, pp. 60–61.

*Primary Examiner*—John B. Sotomayor
*Attorney, Agent, or Firm*—Nixon & Vanderhye P.C.

[57] ABSTRACT

The attitude of a body 12 is determined, or refined, by illuminating it with a direct beam and one or more indirect beams which are reflected from a scattering surface SS, all of the beams being radiated from the same or adjacent sources. The directions of arrival of the beams are determined to allow the attitude to be determined or refined.

3 Claims, 1 Drawing Sheet

METHODS AND SYSTEMS OF ATTITUDE DETERMINATION

BACKGROUND OF THE INVENTION

1. Field of the Invention

This invention relates to methods and systems for determining the attitude of an object. In particular, but not exclusively, the invention relates to such systems and methods for determining, without ambiguity, the attitude of an object by means of a radio or other electromagnetic wave signal or signals transmitted from a single source position. The object may be, for example, a vehicle such as an aircraft, or spacecraft, or a projectile such as a guided missile or a course-corrected shell.

2. Discussion of Prior Art

It is often desired to determine the attitude of a vehicle with respect to some fixed axis system. This may be required to direct sensing devices, or radio or optical beams in desired directions. Alternatively control means required to direct the vehicle on a desired course may require that the vehicle be set to a prescribed attitude. Methods exist, e.g. Inertial Navigation, by which vehicle attitude can be obtained without the use of radio systems. It may however not be convenient to employ such methods FIG. 1 of the accompanying drawings shows a conventional radio attitude determination system which allows attitude determination in only two of the three axes. Radio signals from a transmitting antenna T in a known location are received by an antenna V on the object whose attitude is to be determined. By conventional tracking methods, the resolved components $(\alpha,\beta)$ of the angle between the direction of arrival of the radio signals and an axis (X) which is fixed in the object, e.g. the boresight of the receiving antenna V, are determined. As noted, in this basic form the attitude of the object is not completely determined, since rotation about the X-axis is not measured.

The attitude in a third axis may be determined in various known ways but each has disadvantages. For example, two or more transmitting antennas may be provided in known different sites. The angular components between the directions of arrival of the radio signals and axes which are fixed in the object are determined. The angle measurements are then employed to calculate the complete attitude of the object. In this method at least two different sites are needed for the transmitting antennas and this may be a major problem; for example at sea only a single ship may be available to carry the transmitting antenna.

In another method for increasing the completeness of attitude determination, a single antenna transmits a beam which is elliptically polarised with a known major axis direction. The receiving antenna is designed to measure the orientation of the major axis of the received polarisation relative to the antenna. This method allows the attitude to be determined in three axes but there is a 180° ambiguity in the angle which is measured by polarisation and so an additional method is needed to resolve the ambiguity.

A need exists therefore for a method and system which permit unambiguous determination of the attitude of an object by a radiation beam, using only one location for the radiation source or sources.

SUMMARY OF THE INVENTION

According to one aspect of this invention there is provided a method of determining or refining the attitude of an object which comprises directing towards said object a direct beam of electromagnetic radiation and one or more indirect beams of electromagnetic radiation which are reflected from natural or artificial scattering structures, all of the said beams being radiated from the same or adjacent sources, determining the directions of arrival of said beams at said object with respect to said object, and thereby determining or refining the attitude of said object.

According to another aspect of this invention there is provided a navigational system for determining or refining the attitude of an object, comprising beacon means for emitting a direct beam which passes directly to said object and an indirect beam which is reflected or scattered towards said object, and sensor means associated with said body for determining the directions of arrival of said direct and indirect beams thereby to determine or refine the attitude of the object.

According to yet another aspect of the invention there is provided attitude determination apparatus for use in determining or refining the attitude of an object illuminated by a direct beam and an indirect beam from the same or adjacent sources, comprising sensor means for determining the directions of arrival of said direct and indirect beams and processor means responsive to said sensor means for determining or refining the attitude of the object.

BRIEF DESCRIPTION OF THE DRAWINGS

The invention may be performed in various ways and certain embodiments thereof will now be described by way of example, reference being made to the accompanying drawings, in which.

DETAILED DISCUSSION OF PREFERRED EMBODIMENTS

In this description the term "radio" is used for convenience to include electromagnetic radiation in the ultra violet, visible, and infra-red bands as well as conventional radio frequency bands.

Figure 2:
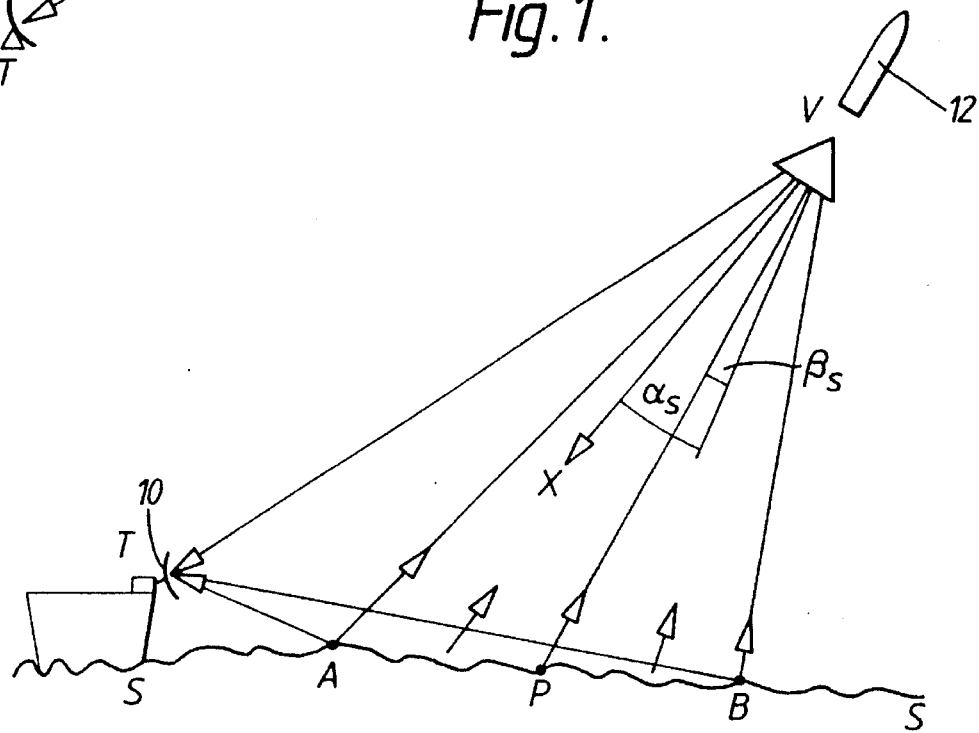
FIG. 2 is a schematic diagram showing a radio attitude determination system in accordance with the invention.
Figure 3:
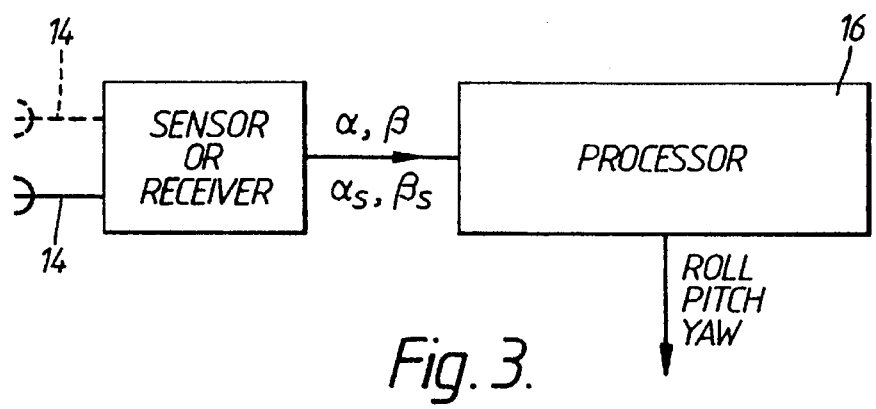
FIG. 3 is a block diagram of the sensors and processor on board the object of FIG. 2.

The system illustrated in FIGS. 2 and 3 permits the unambiguous determination of the attitude of a vehicle or object by radio, using only one location for the transmitting antenna.

In FIG. 2 a transmitting antenna 10 transmits two beams to a vehicle 12. One passes directly to the vehicle, and the other is oriented to illuminate a selected region AB of the scatterer SS. This scatterer may be a natural structure such as the surface of the Earth (land or sea) or the surface of another astronomical body. The scatterer may also be an artificial structure. The region AB scatters the radio signal some of which arrives at the vehicle 12. An antenna 14 (FIG. 3) on board the vehicle receives both the direct signal and the indirect signal scattered from the region AB. Alternatively each of the signals may be received by a separate antenna. The vehicle attitude is determined as far as possible using one of the methods described with reference to FIG. 1. There will remain at least a 180° ambiguity in rotation angle about the direct line connecting the transmitting antenna 10 to the vehicle 12. By conventional tracking methods, e.g. monopulse, a sensor or receiver 15 on board the vehicle 12 calculates the angles $\alpha_s, \beta_s$, between an axis x fixed with respect to the receiving antenna and a line PV from the mean source position in the region AB to the vehicle 12. The processor 16 combines these angles with the partial attitude information derived from one of the methods of FIG. 1 to provide an improvement in the completeness of attitude determination.

Instead of using a single antenna to transmit both a direct beam and a reflected beam, separate transmitting antennas may be provided in substantially the same locations, e.g. on board the same tracking vehicle.

The direct and reflected beams may be multiplexed in a suitable way and transmitted simultaneously or they may be transmitted sequentially with the vehicle or antenna attitude changed through known angles between reception from successive transmitting antennas. Because a finite area AB scatters towards the vehicle 12, rather than a point source, the angles $\alpha_s$ and $\beta_s$ may In some cases not be measured to high accuracy, but the resulting information is adequate for many practical applications.

Figure 1:
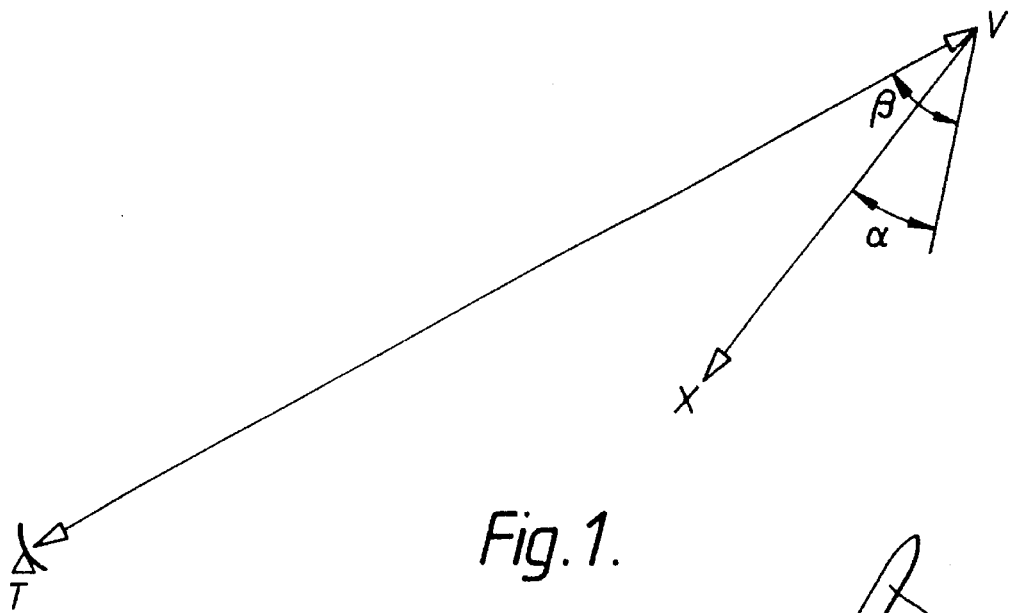
FIG. 1 is a schematic diagram showing a conventional radio attitude determination system.

In one embodiment of this invention, the angles $\alpha$ and $\beta$ are obtained from the method shown in FIG. 1 and the rotation angle of the vehicle about the line TV connecting the transmitter and the vehicle may be obtained from $\alpha_s$ and $\beta_s$. In another embodiment, the attitude in three axes is determined using a polarised radiation beam as in the FIG. 1 method, with a 180° ambiguity in one of the axes and the indirect beam is used to determine which of the two ambiguous positions is present; the accuracy of measurement of $\alpha$s and $\beta$s required is very low.

In a particular case, if the vehicle is spinning about a suitable axis, as would a gun-launched projectile, the modulation of signal as a receive antenna beam scans through the illuminated area AB can be used to estimate the angles $\alpha_s$ and $\beta_s$, and this is therefore of particular benefit in improving guidance of gun-launched projectiles.

We claim:

1. A method of determining the three axis attitude of an object which comprises:

directing towards said object a direct beam of electromagnetic radiation and at least one indirect beam of electromagnetic radiation which is reflected from a scattering structure;

determining the directions of arrival of said beams at said object with respect to said object; and determining the 3-axis attitude of said object based upon said arrival directions, wherein the attitude of the object in two axes is determined using the direction of arrival of one of said direct and indirect beams and the other of said direct and indirect beams is used to determine the attitude of the object in a third axis.

2. A method of determining the three axis attitude of an object which comprises:

directing towards said object a direct beam of electromagnetic radiation and at least one indirect beam of electromagnetic radiation which is reflected from a scattering structure;

determining the directions of arrival of said beams at said object with respect to said object; and determining the 3-axis attitude of said object based upon said arrival directions, wherein the attitude of the object in two axes is determined using the direction of arrival of one of the direct and indirect beams, the attitude of the object in a third axis is determined with an ambiguity of 180° by measurement of the orientation of the polarisation ellipse of the received signal from one of the direct and indirect beams, and the said ambiguity is resolved by determining the direction of arrival of a beam which is distinct from the beam which is employed to determine the attitude of said object in said third axis.

3. A method of determining the three axis attitude of an object which comprises:

directing towards said object a direct beam of electromagnetic radiation and at least one indirect beam of electromagnetic radiation which is reflected from a scattering structure;

determining the directions of arrival of said beams at said object with respect to said object; and determining the 3-axis attitude of said object based upon said arrival directions, wherein the object is spinning, further including the step of detecting consequent modulation of the intensity of the signal corresponding to at least one of said direct and indirect beams and using said modulation to determine attitude information.

* * * * *